(12) United States Patent
Fan et al.

(10) Patent No.: US 11,993,059 B2
(45) Date of Patent: May 28, 2024

(54) MULTI-LAYER FILM

(71) Applicant: SABIC GLOBAL TECHNOLOGIES B.V., Bergen Op Zoom (NL)

(72) Inventors: Ling Fan, Geleen (NL); Jana Hrachova, Geleen (NL); Bart Van Den Esschert, Geleen (NL); Jun Zhou, Geleen (NL); Feng Gong, Geleen (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 747 days.

(21) Appl. No.: 16/470,612

(22) PCT Filed: Nov. 8, 2017

(86) PCT No.: PCT/CN2017/109942
§ 371 (c)(1),
(2) Date: Jun. 18, 2019

(87) PCT Pub. No.: WO2018/113434
PCT Pub. Date: Jun. 28, 2018

(65) Prior Publication Data
US 2020/0086612 A1 Mar. 19, 2020

(30) Foreign Application Priority Data

Dec. 19, 2016 (CN) .......................... 201611176054.9

(51) Int. Cl.
| | |
|---|---|
| *B32B 7/12* | (2006.01) |
| *B32B 27/08* | (2006.01) |
| *B32B 27/30* | (2006.01) |
| *B65D 75/58* | (2006.01) |
| *C09J 123/08* | (2006.01) |

(52) U.S. Cl.
CPC ............ *B32B 27/08* (2013.01); *B32B 27/306* (2013.01); *B65D 75/5855* (2013.01); *B32B 2307/31* (2013.01); *C09J 123/0853* (2013.01); *Y10T 428/2817* (2015.01); *Y10T 428/2848* (2015.01)

(58) Field of Classification Search
None
See application file for complete search history.

(56) References Cited

U.S. PATENT DOCUMENTS

| | | | |
|---|---|---|---|
| 5,889,120 A | 3/1999 | O'Donnell | |
| 6,670,012 B2* | 12/2003 | Campbell ......... | B29C 66/12841 428/60 |
| 6,677,012 B1* | 1/2004 | Lind .......................... | B32B 7/12 428/35.2 |
| 6,787,220 B2* | 9/2004 | Wallace .................. | B32B 27/08 428/212 |
| 2002/0013415 A1 | 1/2002 | Mechelaere et al. | |
| 2003/0157355 A1 | 8/2003 | Wallace et al. | |
| 2005/0020777 A1 | 1/2005 | Breese et al. | |
| 2006/0110554 A1* | 5/2006 | Bernig ..................... | B32B 27/32 428/35.2 |
| 2008/0118688 A1 | 5/2008 | Kinigakis et al. | |
| 2010/0048796 A1* | 2/2010 | Prejean ............... | C08L 23/0853 524/502 |
| 2011/0125114 A1* | 5/2011 | Bekele .................... | A61F 5/445 181/290 |
| 2020/0079060 A1* | 3/2020 | Fan ......................... | B32B 27/32 |

FOREIGN PATENT DOCUMENTS

| | | |
|---|---|---|
| CN | 1411409 A | 4/2003 |
| CN | 101318577 A | 12/2008 |
| CN | 102862361 A | 1/2013 |
| CN | 1030790502 A | 5/2013 |
| CN | 104081539 A | 10/2014 |
| CN | 105273669 A | 1/2016 |
| EP | 1749656 A1 | 2/2007 |
| JP | 2002265791 A | 9/2002 |
| WO | 2010135544 A1 | 11/2010 |
| WO | 2018096015 A1 | 5/2018 |
| WO | 2018096016 A1 | 5/2018 |
| WO | 2018113455 A1 | 6/2018 |
| WO | 2018115224 A1 | 6/2018 |

OTHER PUBLICATIONS

"What's the difference between LDPE, LLDPE, MDPE, HDPE, XLPE and UHMW sheeting", United States Plastic Corporation, published Aug. 13, 2008 (Year: 2008).*
Product data sheet "SABIC LLDPE 118N Linear low density polyethylene for blown film", Sabic, retrieved on Apr. 27, 2023 (Year: 2023).*
International Search Report; International Application No. PCT/CN2017/109942; International Filing Date: Nov. 8, 2017; dated Feb. 12, 2018; 4 pages.
International Search Report; International Application No. PCT/CN2017/111119; International Filing Date: Nov. 15, 2017; dated Feb. 9, 2018; 4 pages.
Peacock, Andrew J., "Handbook of Polyethylene, Chapter 3 Production Processes", 2000, Marcel Dekker, Inc., New York; ISBN 0824795466; p. 43-66.
Written Opinion; International Application No. PCT/CN2017/109942; International Filing Date: Nov. 8, 2017; dated Feb. 12, 2018; 4 pages.

(Continued)

*Primary Examiner* — Anish P Desai
(74) *Attorney, Agent, or Firm* — CANTOR COLBURN LLP

(57) ABSTRACT

A multi-layer film for seal-peel applications, an article comprising said film and the use of said film a disclosed. The multi-layer film for seal-peel application comprising at least two layers, namely a cover layer and a seal layer, whereby the seal layer comprises between 25 and 80 wt. % of EVA and between 20 and 75 wt. % of LLDPE based on the total weight of the layer.

11 Claims, No Drawings

(56) References Cited

OTHER PUBLICATIONS

Written Opinion; International Application No. PCT/CN2017/111119; International Filing Date: Nov. 15, 2017; dated Feb. 9, 2018; 4 pages.

* cited by examiner

MULTI-LAYER FILM

CROSS REFERENCE TO RELATED APPLICATIONS

This application is a 371 of International Application No. PCT/CN2017/109942, filed Nov. 8, 2017, which is incorporated by reference in its entirety, and which claims priority to Chinese Application Serial No. 201611176054.9 filed Dec. 19, 2016.

The invention relates to a multi-layer film for seal-peel applications, an article comprising said film and the use of said film.

Films for seal-peel applications are heat sealable-films, which may be heat sealed to themselves or to a substrate, that have a limited peel strength, so as to be easy to open along the seal.

Heat-sealable films used in the packaging field, especially in the food packaging field, have often to be easily detachable along the seals, in order to be removed or to allow opening of the wrap. In such cases the peel strength should correspond to a consumer friendly opening force.

To achieve that heat-sealable films of polyolefin materials have been proposed, generally comprising a support layer and a sealing layer. Such films are usually called seal peel films or films for seal-peel and/or easy-open applications. Such films are known for example from US20020013415.

However, despite previous research in the field, there is always a continuous need for films with an improved properties, especially improved adhesion to different substrates, particularly polar substrates, such as for example polyethylene terephthalate (PET) substrates, and/or a wide sealing temperature window and/or a low sealing temperature.

Therefore, it is the object of the invention to provide multi-layer films film for seal-peel applications having a good adhesion when heat sealed, especially on polar substrates, such as for example PET substrate, and/or a wide sealing temperature window and/or a low sealing temperature.

This object is achieved by a multi-layer film comprising at least two layers, namely a cover layer and a seal layer, whereby the a seal layer comprises or consists of between 25 and 80 wt. % of EVA and between 20 and 75 wt. % of LLDPE based on the total weight of the layer. This may contribute to a good adhesion on polar substrates, such as for example PET substrates.

Linear low density polyethylene (LLDPE) may be a copolymer of ethylene and at least one α-olefin, such as for example 1-butene, 1-pentene, 1-hexene, 1-octene, or 4-methylpentene-1, most preferably 1-butene 1-hexene or 1-octene. An ethylene copolymer may especially be a polyolefin plastomer or a polyolefin elastomer. Preferably, the alpha-olefin co monomer of LLDPE may be present for example in an amount of about 1 to about 25, preferably 5 to about 20 percent by weight of the ethylene-alpha olefin copolymer, preferably of 5 to about 20 percent by weight of the ethylene-alpha olefin copolymer, more preferably an amount of from about 7 to about 15 percent by weight of the ethylene-alpha olefin copolymer. LLDPE, as used herein, may be produced for example using metallocene and/or Ziegler-Natta catalysts.

Preferably, LLDPE according to the invention has a density between 0.850 and <0.945 g/cm$^3$, more preferably between 0.900 to 0.935 g/cm$^3$, further preferred between 0.915 to 0.927 g/cm$^3$. For purpose of the invention, the density of LLDPE is determined using ISO1872-2.

Preferably, the melt flow index of the LLDPE ranges from 0.3 to 15 g/10 min, from 1 to 10 g/10 min, for example from 2 to 6 g/10 min, for example from 2.5 to 3.5 g/10 min. For purpose of the invention, the melt flow index is determined herein using ISO1133:2011 (190° C./2.16 kg).

The amount of linear low density polyethylene in the seal layer may be preferably between 20% and 75% by weight based on the total weight of the layer, between 25% and 70% by weight based on the total weight of the layer or between 51 and 70% by weight based on the total weight of the layer.

Ethylene vinyl acetate (EVA) is a copolymer of ethylene and vinyl acetate.

Preferably, the melt flow index of the EVA ranges from 1 to 35 g/10 min, for example from 1.5 to 30 g/10 min, for example from 1.5 to 20 g/10 min, for example from 1.5 to 3 g/10 min or from 10 to 20 g/10 min. For the purpose of the invention, the melt flow index of EVA is determined herein using ASTM-D1238 (190° C./2.16 kg).

Preferably, EVA according to the invention has a density between 0.900 and 0.970 g/cm$^3$, more preferably between 0.910 to 0.965 g/cm$^3$, further preferred between 0.920 to 0.960 g/cm$^3$. For purpose of the invention, the density of EVA is determined using ISO1183.

The vinyl acetate content of the EVA may be for example between 4 and 50 wt. %, preferably between 8 and 45 wt. %, further preferred between 10 and 40 wt. %, further preferred between 15 and 35 wt. %. This may contribute to a good adhesion on polar substrates, such as for example PET substrates.

The amount of EVA in the seal layer may be preferably between 25% and 80% by weight based on the total weight of the layer, between 30% and 75% by weight based on the total weight of the layer or between 30 and 49% by weight based on the total weight of the layer. This may contribute to a good adhesion on polar substrates, such as for example PET substrates.

A multi-layer film according to the invention may comprise at least one, preferably exactly one, seal layer.

A multi-layer film according to the invention may comprise at least one, preferably at least two, further preferred at least three, further preferred at least four, further preferred at least five cover layer(s).

That the seal layer may preferably consist of between 25 and 80 wt. % of EVA and between 20 and 75 wt. % of LLDPE based on the total weight of the layer may mean that the seal layer may preferably not comprise any further polymer and/or may not comprise any further polyolefin and/or may not comprise any LDPE.

Preferably, when the EVA content of the seal layer is <50 wt. % the vinyl acetate content of the EVA may be >20 wt. %. Alternatively, when the EVA content of the seal layer is >50 wt. % the vinyl acetate content of the EVA may be <20 wt. %. This may contribute to a good adhesion on polar substrates, such as for example PET substrates.

The seal layer of a multilayer-film according to the invention may preferable for example comprise only one LLDPE and/or not two or more different LLDPE's that may differ from example on density and/or on MFR.

The seal layer of a multilayer-film according to the invention may preferable for example comprise only one EVA and/or not two or more different EVA's that may differ from example on vinyl acetate content and/or on MFR.

A multi-layer film according to the invention may comprise a first LDPE cover layer arranged on and in contact with the seal layer and a second cover layer of a blend of LLDPE and LDPE arranged on and in contact with the LDPE cover layer.

A multi-layer film according to the invention may comprise a first LDPE cover layer arranged on and in contact with the seal layer, a second cover layer of a blend of LLDPE and LDPE arranged on and in contact with the LDPE cover layer, a third adhesive cover layer arranged on and in contact with the LLDPE/LDPE blend cover layer and a fourth nylon cover layer arranged on and in contact with the adhesive cover layer. The seal layer and the nylon cover layer thereby represent the outermost layers.

The production processes of LDPE, HDPE and LLDPE are summarized in Handbook of Polyethylene by Andrew Peacock (2000; Dekker; ISBN 0824795466) at pages 43-66. The catalysts can be divided in three different subclasses including Ziegler Natta catalysts, Phillips catalysts and single site catalysts. The latter class is a family of different classes of compounds, metallocene catalysts being one of them. As elucidated at pages 53-54 of said Handbook a Ziegler-Natta catalyzed polymer is obtained via the interaction of an organometallic compound or hydride of a Group I-III metal with a derivative of a Group IV-VIII transition metal. An example of a (modified) Ziegler-Natta catalyst is a catalyst based on titanium tetra chloride and the organometallic compound triethylaluminium. A difference between metallocene catalysts and Ziegler Natta catalysts is the distribution of active sites. Ziegler Natta catalysts are heterogeneous and have many active sites. Consequently polymers produced with these different catalysts will be different regarding for example the molecular weight distribution and the comonomer distribution.

The technologies suitable for the LLDPE manufacture include but are not limited to gas-phase fluidized-bed polymerization, polymerization in solution, and slurry polymerization.

Preferably, the density of the low density polyethylene (LDPE) ranges from 0.915 to 0.932 g/cm$^3$, further preferred for example from 0.917 to 0.926 g/cm$^3$. Preferably, the melt flow index as determined using ISO1133:2011 (190° C./2.16 kg) ranges from 0.01 to 4 g/10 min, for example from 0.09 to 3 g/10 min, for example from 0.1 to 1 g/10 min, for example from 0.2 to 0.6 g/10 min.

The LDPE applied in the present film may be produced by use of autoclave high pressure technology and by tubular reactor technology.

Preferably, the density of the HDPE ranges from 0.940 to 0.965 g/cm$^3$. Preferably, the melt flow index as determined using ISO1133:2011 (190° C./2.16 kg) ranges from 0.1 to 4 g/10 min, for example from 0.3 to 3 g/10 min, for example from 0.2 to 2 g/10 min, for example from 0.5 to 1.5 g/10 min.

The components of the seal layer according to the invention may preferably add up to 100 wt. % of the seal layer.

The thickness of multi-layer film of the invention may range for example from 15 to 200 μm, for example from 50 to 150 μm, especially for example between 60 to 125 μm. Not all layers in the multi-layer film of the invention need to have the same thickness. For example, one or more layers in the multi-layer film may be thicker than the other layers, especially for example to increase the stability of the production process. Each layer or all layers may have a thickness of for example between 10 and 23 μm, preferably between 15 and 25 μm.

For example, each layer in the multi-layer film of the invention may comprise an amount of additives of 0 to 10 wt. %, especially for example 0 to 8 wt. % based on the total weight of the layer, wherein the sum of the polymer(s) and the additives is 100 wt. % based on the total weight of the layer.

Additives may thereby especially for example be UV stabilizers, antistatic agents, slip/anti-block agents, fluor elastomers used as polymer processing aids and/or mixtures of two or more thereof. Especially for example an erucamide and/or an oleamide and/or silica and/or talc.

Each layer may also contain appropriate amounts of other additives such as for example fillers, antioxidants, pigments and polymers depending on the specific use of the multi-layer film. Typically, additives may be present in a layer in an amount of 10 to 10000 ppm, for example in an amount of 100 to 5000 ppm based on the layer. Therefore, the invention also relates to a multi-layer film wherein one or more layers further comprise(s) one or more additives or other additives.

The multi-layer films of the present invention may for example have peel strength on PET of between 1 and 20 N/15 mm, preferable between 1.5 and 15 N/15 mm, further preferred between 1.6 and 12 N/15 mm, further preferred between 1.5 and 8.5 N/15 mm, further preferred between 3 and 8 N/15 mm or between 3 and 6 N/15 mm, especially for example with a sealing temperature between 80° C. and 150° C., preferably at 80° C. and/or 90° C. and/or 100° C. and/or 110° C. and/or 130° C. and/or 150° C. This may contribute to achieve a sufficiently easy opening Peel strength may be measured according to ASTM F88 method C on PET as a substrate with a strip width of 15 mm, a separation rate of 200 mm/min and a sealing temperature between 80° C. and 150° C., preferably between 90° C. and 150° C., whereby samples are allowed to cool down for at least 72 h before measuring. The standard testing condition was follow: dwell time was 1.5 second, pressure was 4 bar, width and length of sealing bar size was 10 mm*150 mm, a separation rate of 200 mm/min, sealing temperature was from 80° C. to 150° C., preferably at 80° C. and/or 90° C. and/or 110° C. and/or 130° C. and/or 150° C.

The seal layer may comprise a blend of LLDPE and EVA, which may preferably be obtained by melt blending for example at a temperature between 120 and 200° C., preferably between 155 and 180° C., further preferred at a temperature between 155 and 165° C. or between 170 and 180° C. Melt blending the LLDPE and EVA of the seal layer at a lower temperature may thereby contribute to improve the peel strength.

The present invention also concerns an article and/or packaging comprising a multi-layer film according to the invention.

Furthermore, the present invention also concerns the use of the multi-layer film according to the invention for food packaging applications.

It is further noted that the invention relates to all possible combinations of features described herein, preferred in particular are those combinations of features that are present in the claims.

It is further noted that the term 'comprising' does not exclude the presence of other elements. However, it is also to be understood that a description on a product comprising certain components also discloses a product consisting of these components.

The invention is now further explained by way of the following examples.

EXAMPLES

As shown in Table 1 below, the seal layer was compounded in a ZSK-26MC twin screw extruder from W&P. Maximum extrusion temperature was 170 and 160° C. for NT and LT conditions respectively. Similarly melt temperature was 175° C. and 162° C., screw speed was 300 rpm and 250 rpm again for NT and LT conditions respectively. Output was 15 kg/hour in both NT and LT conditions.

TABLE 1

| Parameters | UOM | *NT | *LT |
|---|---|---|---|
| Feed (Zone 0) Temp | °C. | 50 | 50 |
| Zone 1 Temp | °C. | 100 | 100 |
| Zone 2 Temp | °C. | 130 | 130 |
| Zone 3 Temp | °C. | 140 | 130 |
| Zone 4 Temp | °C. | 150 | 130 |
| Zone 5 Temp | °C. | 160 | 125 |
| Zone 6 Temp | °C. | 160 | 125 |
| Zone 7 Temp | °C. | 160 | 125 |
| Zone 8 Temp | °C. | 160 | 115 |
| Zone 9 Temp | °C. | 160 | 110 |
| Zone 10 Temp | °C. | 160 | 100 |
| Die Temp | °C. | 170 | 160 |
| Screw speed | rpm | 300 | 250 |
| Throughput | kg/hr | 15 | 15 |
| Tmelt | % | 175 | 162 |

Normal temperature conditions (NT) and lower temperature conditions (LT) for the compounding are reported in Table 1 above.

Four different seal layers 1, 2, 3a and 3b were obtained with the compositions as presented in Table 2 below.

TABLE 2

| | EVA | | PE | | Compound | |
|---|---|---|---|---|---|---|
| No. | Grade | EVA wt. % | Grade | PE wt. % | parameter MI | Processing |
| 1 | ELVAX460 | 69 | 6318BE | 31 | 2.65 | NT |
| 2 | EVAFLEX EV250 | 35 | 6318BE | 65 | 7.2 | NT |
| 3a | EVAFLEX EV250 | 44 | 6318BE | 56 | 8.28 | NT |
| 3b | EVAFLEX EV250 | 44 | 6318BE | 56 | 8.28 | LT |

As EVA, two Dupont grades ELVAX460 and EVAFLEX EV250 (Dupont-Mitsui) were used. As LLDPE SABIC grade 6318BE was used. Seal layer 3b has been produced using lower temperature (LT) compounding conditions as reported above in Table 1.

3 layer films were produced on a Labtech, LF40000EX multilayer extrusion blow film machine as indicated below in Table 3, BUR was 2, die gap was 2.0, total thickness was 50 micron.

A second cover layer comprising 30 wt. % of low density polyethylene of SABIC grade 2201H0W and 70 wt. % of linear low density polyethylene of SABIC grade 6118NSF is arranged in contact with the first cover layer. A first cover layer of low density polyethylene of SABIC grade 2201H0W is arranged in contact with the seal layer.

The thicknesses of second cover layer, the first cover layer and the seal layer were 17.5 microns, 17.5 microns and 15 microns respectively. The extrusion temperatures for the second cover layer, the first cover layer and the seal layer were 210° C., 210° C. and 175° C., respectively.

TABLE 3

| Layer information (%) | Profile °C. | Layer °C. | Pipe °C. | Adaptor °C. | Barrel 4 °C. | Barrel 3 °C. | Barrel 2 °C. | Barrel 1 °C. |
|---|---|---|---|---|---|---|---|---|
| Second cover layer | 35 | 210 | 210 | 210 | 210 | 210 | 190 | 170 |
| First cover layer | 35 | 210 | 210 | 210 | 210 | 210 | 190 | 170 |
| Seal layer | 30 | 210 | 175 | 175 | 175 | 175 | 175 | 125 |

After a corona treatment with a CTP-2000K Plasma generator provided on the 3 layer films, the 3 layers film above was laminated to a 15 micron biaxially oriented nylon film with an adhesive substance, namely Liofol LA2788, using a FM380 lamination machine from Simeile. The coating weight was 2.85 g/m2.

Table 4 shows the peel strength values in N/15 mm for different seal temperatures obtained with the 3 layer films above (see Table 3) with different seal layers 1, 2, 3a and 3b (see Table 2).

TABLE 4

| | peel strength values (N/15 mm) | | | | |
|---|---|---|---|---|---|
| | Seal temperature | | | | |
| | 80° C. | 90° C. | 110° C. | 130° C. | 150° C. |
| Seal layer No. 1 | 1.99 | 1.76 | 6.43 | 8.11 | 10.86 |
| Seal layer No. 2 | 0.79 | 3.68 | 4.50 | 3.50 | 4.92 |
| Seal layer No. 3a | 0.91 | 1.93 | 3.52 | 3.00 | 4.10 |
| Seal layer No 3b | 0.43 | 0.72 | 5.60 | 4.60 | 6.14 |

Peel strength has been measured according to ASTM F88 method C, after keeping under room temperature 72 hours, the film was sealed to a 250 micron PET film with a strip width of 15 mm by a HSG-C seal machine from Brugger. The standard testing condition was follow: dwell time was 1.5 second, pressure was 4 bar, width and length of sealing bar size was 10 mm*150 mm, sealing temperature was from 80° C. to 150° C., separation rate 200 mm/min.

TABLE 5

| | EVAs used | | | |
|---|---|---|---|---|
| Grade | Vendor | MI | VA content (wt. %) | density |
| ELVAX460 | Dupont | 2.5 | 18 | 0.941 |
| EVAFLEX EV250 | Dupont-Mitsui | 15 | 28 | 0.950 |

The invention claimed is:

1. A multi-layer film for seal-peel application comprising at least two layers, namely a cover layer and a seal layer,
   wherein the cover layer comprises a first low density polyethylene (LDPE) cover layer and a second cover layer,
   the first LDPE cover layer is arranged on and in contact with the seal layer,
   the second cover layer is a blend of liner low density polyethylene (LLDPE) and a LDPE, and
   the second cover layer is arranged on and in contact with the first LDPE cover layer; and
   wherein the seal layer comprises between 30 and 75 wt. % of ethylene vinyl acetate (EVA) and between 25 and 70 wt. % of linear low density polyethylene (LLDPE) based on the total weight of the seal layer, the EVA is a copolymer of ethylene and vinyl acetate and the vinyl acetate content of the EVA is between 35 wt. % and 40 wt. % based on the total weight of the EVA, the melt flow index of the EVA ranges from 2 to 20 g/10 min, and the LLDPE has a density between 0.900 to 0.935 g/cm³ and a melt flow index ranging from 1 to 10 g/10 min.

2. The multi-layer film according to claim 1, wherein the amount of LLDPE in the seal layer is between 51 and 70 wt. % based on the total weight of the seal layer.

3. The multi-layer film according to claim 1, wherein the amount of EVA in the seal layer is between 30 to 49 wt. % based on the total weight of the seal layer.

4. The multi-layer film according to claim 1, wherein the seal layer comprises only one LLDPE.

5. The multi-layer film according to claim 1, wherein the seal layer is obtained by melt blending the LLDPE and EVA at a temperature between 120 and 200° C.

6. The multi-layer film according to claim 1, wherein the film has a peel strength on polyethylene terephthalate (PET) of between 1 and 20 N/15 mm, measured according to ASTM F88 method C with a strip width of 15 mm, a separation rate of 200 mm/min, and a sealing temperature of 80° C.

7. An article and/or packaging comprising the multi-layer film according to claim 1.

8. The multi-layer film according to claim 1,
wherein the melt flow index of the LLDPE ranges from 2.5 to 3.5 g/10 min,
wherein the amount of LLDPE in the seal layer is between 51 and 70 wt. % based on the total weight of the seal layer,
wherein the amount of EVA in the seal layer is between 30 and 49 wt. % based on the total weight of the seal layer,
wherein the melt flow index of the EVA ranges from 2 to 3 g/10 min or from 10 to 20 g/10 min,
and
wherein the film has a peel strength on polyethylene terephthalate (PET) of between 1.5 and 15 N/15 mm, measured according to ASTM F88 method C with a strip width of 15 mm, a separation rate of 200 mm/min, and a sealing temperature of 80° C.

9. A multi-layer film for seal-peel application comprising a cover layer and a seal layer, wherein the seal layer comprises between 25 and 80 wt. % of ethylene vinyl acetate (EVA) and between 20 and 75 wt. % of linear low density polyethylene (LLDPE) based on the total weight of the seal layer, and
wherein
the cover layer comprises a first low density polyethylene (LDPE) cover layer and a second cover layer, wherein the first LDPE cover layer is arranged on and in contact with the seal layer, wherein the second cover layer is a blend of LLDPE and a LDPE, wherein the second cover layer is arranged on and in contact with the first LDPE cover layer, and
the film has a peel strength on polyethylene terephthalate (PET) of between 1 and 20 N/15 mm, measured according to ASTM F88 method C with a strip width of 15 mm, a separation rate of 200 mm/min, and a sealing temperature of 80° C.

10. The multi-layer film according to claim 9, wherein the seal layer comprises only one LLDPE.

11. A multi-layer film according to claim 9,
whereby the seal layer comprises between 25 and 50 wt. % of ethylene vinyl acetate (EVA) and between 50 and 75 wt. % of linear low density polyethylene (LLDPE) based on the total weight of the seal layer; and
wherein vinyl acetate content of the EVA is between 35 wt. % and 50 wt. % based on the total weight of the EVA.

* * * * *